United States Patent [19]
Light

[11] Patent Number: 6,131,091
[45] Date of Patent: Oct. 10, 2000

[54] SYSTEM AND METHOD FOR HIGH-PERFORMANCE DATA EVALUATION

[75] Inventor: John J. Light, Hillsboro, Oreg.

[73] Assignee: Intel Corporation, Santa Clara, Calif.

[21] Appl. No.: 09/078,645

[22] Filed: May 14, 1998

[51] Int. Cl.$^7$ .................................................. G06F 17/30

[52] U.S. Cl. ................................ 707/5; 707/10; 707/100; 707/500; 704/235; 709/201

[58] Field of Search ............... 707/2–4, 5, 100, 707/10, 500, 530; 704/235, 270; 709/201; 711/129

[56] References Cited

U.S. PATENT DOCUMENTS

| | | | |
|---|---|---|---|
| 5,619,709 | 4/1997 | Caid et al. ............................... | 395/794 |
| 5,724,567 | 3/1998 | Rose et al. ............................... | 707/2 |
| 5,774,888 | 6/1998 | Light ............................................. | 707/5 |
| 5,778,363 | 7/1998 | Light ............................................. | 707/5 |
| 5,799,273 | 8/1998 | Mitchell et al. .......................... | 704/235 |
| 5,857,099 | 1/1999 | Mitchell et al. .......................... | 704/235 |
| 5,870,740 | 2/1999 | Rose et al. ............................... | 707/5 |
| 5,915,250 | 6/1999 | Jain et al. ................................. | 707/100 |
| 5,924,094 | 7/1999 | Sutter ......................................... | 707/10 |
| 6,006,221 | 12/1999 | Liddy et al. ............................... | 707/5 |

OTHER PUBLICATIONS

Glassco, Richard, "Evaluating commercial text search–and–retrieval packages", Information Technology and Libraries; Chicaogo, Dec. 1993, vol. 12, Issue 4, Start p. 413, ISSN: 07309298.

Kwok, K. L., "Experiments with a component Theory of Probabilistic Information Retrieval Based on Single Terms as Document Components", ACM Transactions on Information System, vol. 8, No. 4, Oct. 1990, pp. 363–386.

Vinsonhaler, John et al., "Using a knowledge system to document and evaluate faculty productivity in a college of business", Journal of Education for Business, Washington, Jul. 1995, vol. 70, Issue 6, Start p. 337, ISSN 08832323.

Voorhees, Ellen, "Variations in relevance Judgements and the Measurement of Retrieval Effectiveness", National Institute of Standard and Technology, Gaithersburg, MD 20899, SIGIR '98, Melbourne, Australia, ACM 1–58113–015–5 Aug. 1998, pp. 315–323.

Marti A. Hearst, TileBars: Visualization of Term Distribution Information in Full Text Information Access, CHI '95 Mosaic of Creativity, May 7–11, 1995.

*Primary Examiner*—Hosain T. Alam
*Assistant Examiner*—Shahid Alam
*Attorney, Agent, or Firm*—Kenyon & Kenyon

[57] ABSTRACT

A system and method for determining the relevance of streaming data using numerical evaluations contained in topic vectors. A query is generated and a topic-evaluation vector is received. The topic-evaluation vector is compared to the generated query, and an action is taken based on the results of the comparison.

28 Claims, 3 Drawing Sheets

SYSTEM AND METHOD FOR HIGH-PERFORMANCE DATA EVALUATION

FIELD OF THE INVENTION

The present invention relates to information retrieval. More particularly, the present invention relates to relevance determinations of information transmitted over a network.

BACKGROUND

Relatively high-speed data such as audio data and wire-service transmissions can be sent over the Internet. Unfortunately, the transmission speed of these and other types of streaming data causes problems rooted in the recipient's limited ability to receive and store these rapid transmissions. Because of the speed of the data transfer, the receiver must make a quick determination as to what will be kept and what will be discarded so as not to lose or miss desired data.

Typically, the known systems make this determination by including keywords with the document. These keywords are words that an entity at the transmission source has decided are related to the document. A set of topic areas also exists that is manually set, and keywords that pertain to the topic areas are attached to documents as the documents are being authored. The document is received at the other end of the transmission, and the receiver looks at the keywords and decides, based on the relevance of the keywords, whether to keep the document, or what to do with it.

Unfortunately, the known systems are limited by the keyword generator in that keywords are limited both in number and in specific view point, both of which are constrained by the entity inputting the keywords at the source.

SUMMARY OF THE INVENTION

The present invention relates to a system and method for determining the relevance of streaming data using numerical evaluations contained in topic vectors. In one embodiment, a query is generated and a topic-evaluation vector is received. The topic-evaluation vector is compared to the generated query, and an action is taken based on the results of the comparison.

DETAILED DESCRIPTION

Embodiments of the present invention are directed to ways of evaluating relevance of information transmitted over a network. Embodiments of the present invention are superior to known systems in that, rather than using keywords, these embodiments use numerical evaluations based on information sent from the receiver to the sender.

Figure 1:
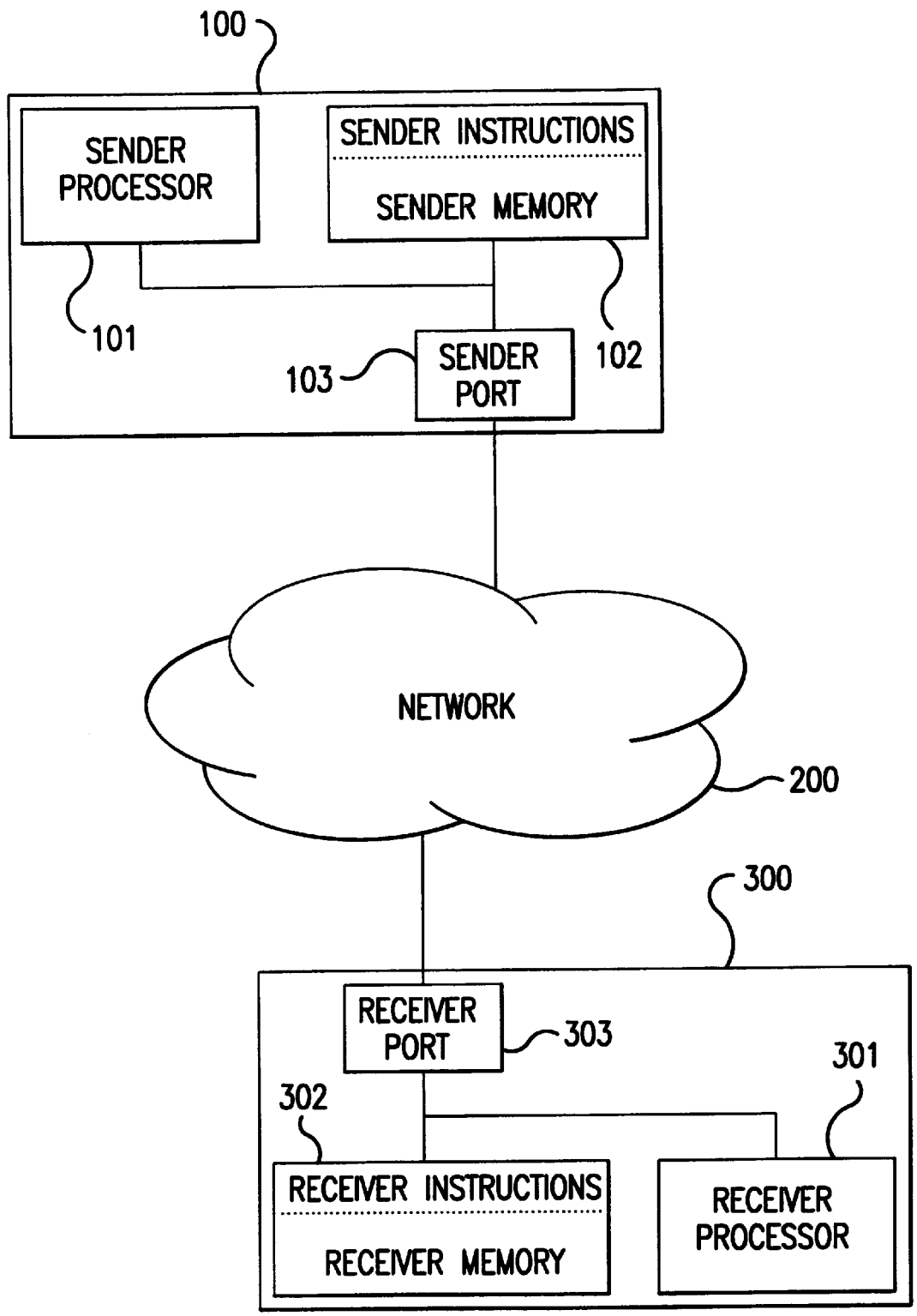
FIG. 1 is a system overview illustrating an embodiment of the present invention.

Turning now to FIG. 1, we see a system overview of an embodiment of the present invention. As a context for the present invention (although not the only possible context), consider data such as a news broadcast streaming from sender 100 to receiver 300 through network 200. In this contextual example, sender 100 can be a news service, or any server, network 200 can be the internet, and receiver 300 can be a desktop computer, or any client. In accordance with an embodiment of the present invention, a topic-evaluation vector is calculated at sender 100. In another embodiment of the present invention, the topic-evaluation vector is calculated at receiver 300.

A topic-evaluation vector is a list of numbers wherein each number represents the relevance of a particular topic. The relevance may be calculated in any known way. For example, one way of calculating relevance involves counting the number of query terms that correlate with a particular topic in a document. The value of the relevance in this case is simply the sum of query terms. In one embodiment of the present invention, the topic-evaluation vector is sparse, and so can be represented compactly in a way that occupies very little band width or storage space. The topic-evaluation vector is then transmitted from the Internet service provider (ISP) to the client along with the streaming data.

In the above contextual examples, the client receives the data stream and needs some way of correlating its needs with the information contained in the topic-evaluation vector; that is, the client needs some way to analyze the relevance vector to see if the document is relevant to the user. To perform this analysis, the client, for example, generates a query of terms that interest the client, and then correlates those terms with the information received in the topic-evaluation vector.

To generalize the above example, the client will be called "receiver," and the server will be called "sender."

Figure 2:
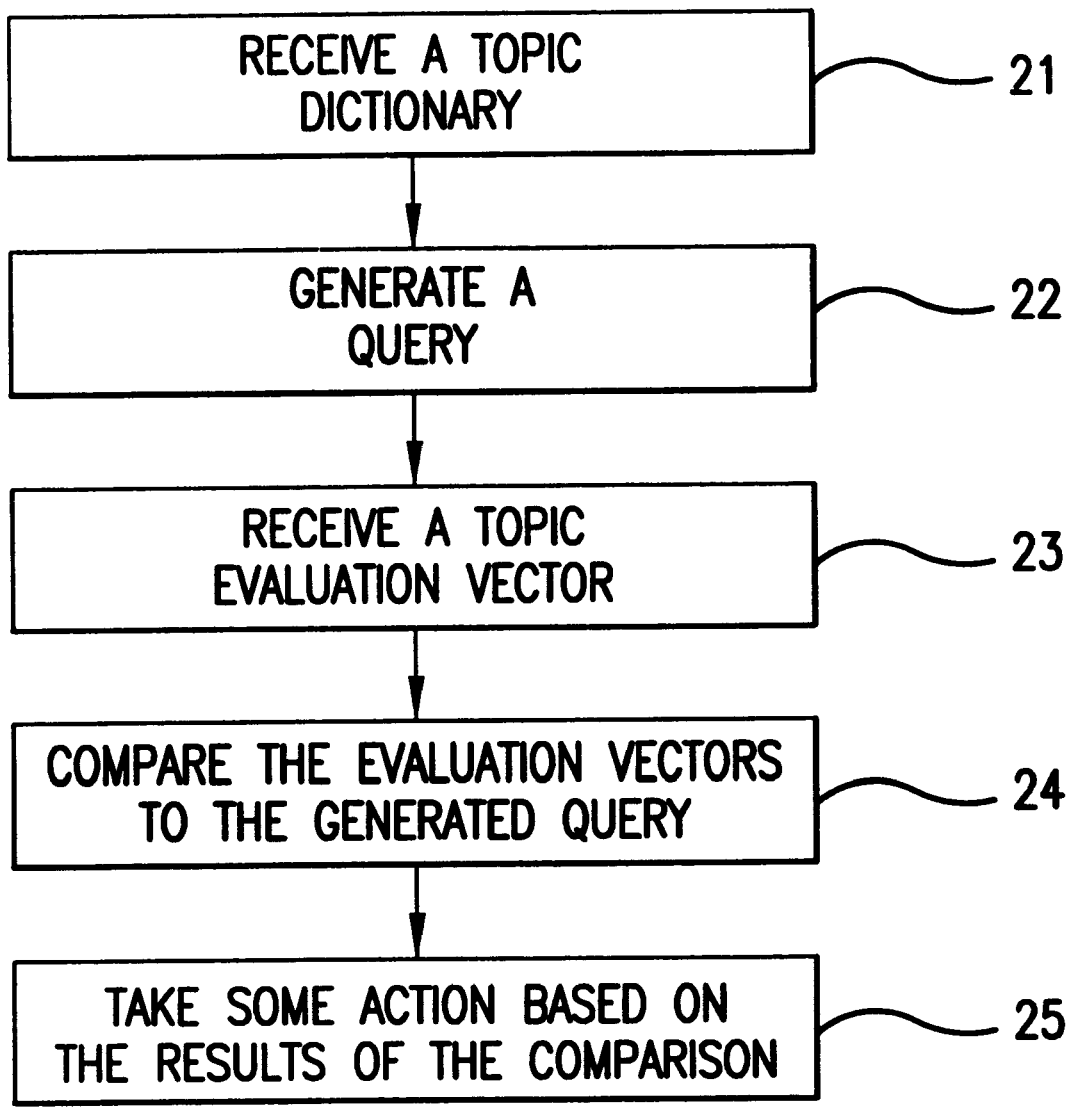
FIG. 2 is a flow chart illustrating an embodiment of a method of evaluating a document's relevance.

Referring now in detail to the drawings, there is illustrated in FIG. 2 a flow chart of an embodiment of a method of receiving and evaluating a documents relevance in accordance with the present invention. The order of the steps in the flow chart does not need to be exactly as portrayed in FIG. 2, and can be implemented in any order that is practicable. At step 21 in the flow chart, a topic dictionary is received. This topic dictionary is data that includes information about where in the topic-evaluation vector certain topics are located. The topic dictionary is not needed if the receiver already possesses this information. Furthermore, receipt of the topic dictionary is shown in FIG. 1 as step 21, although the topic dictionary does not need to be received in the displayed sequence. The topic dictionary may be received anywhere prior to step 24, or not at all if the receiver already possesses this information. At step 22, the receiver generates a query. This query may be boolean or natural language, or some other form, and is ultimately used by the receiver to evaluate received topic-evaluation vectors.

At step 23, the receiver receives a topic-evaluation vector that contains the relevance evaluation of a specific data stream or document. For the purposes of the present invention, the word "receives," where used in this document, includes, but is not limited to, "creates" and "selects." The topic-evaluation vector is a numerical representation of relevance in which each entry in the vector represents the evaluation of a piece of the document.

The receiver then compares the topic-evaluation vector to the generated query at step 24, thereby determining the correlation between the two, and subsequently takes some action at step 25 based on this correlation. For example, if the value of the queried term is higher than, say 100 in the topic-evaluation vector, the receiver can display the data; if the value of the queried term is lower than 100, the receiver can discard the data. Other possible actions are discussed below.

In one embodiment of the present invention, the topic dictionary is received by the receiver simply in response to logging on the sender's network. In another embodiment of the present invention, the topic dictionary is received by the receiver at some evenly-spaced periodic interval. In another embodiment of the present invention, the topic dictionary is received by the receiver only when the topic dictionary is changed since the last time the receiver received it.

In one embodiment of the present invention, the topic-evaluation vector is transmitted along with the data stream or document. In another embodiment of the present invention, the topic-evaluation vector is transmitted separately from the transmitted document with some marker identifying the topic-evaluation vector as belonging to a particular data stream or document.

In one embodiment of the present invention, after the query is generated at step 22, a correlation threshold is set so that the action taken in step 25 is not taken until the value of the queried term is above that threshold in the topic-evaluation vector. For example, assume the receiver creates the following query: "endangered species in North America" or "endangered species in Africa" or "endangered species in South America." Assuming that each of these topics occupies a slot in the topic-evaluation vector, the receiver can set some threshold such that the desired action is taken if "endangered species in North America" has a value above 175 in the topic-evaluation vector, "endangered species in Africa" has a value above 30 in the topic-evaluation vector, and "endangered species in South America" has a value above 225 in the topic-evaluation vector.

In one embodiment of the present invention, if the value of the queried term in step 25 is above the predetermined correlation threshold in the topic-evaluation vector, the document is stored. In another embodiment of the present invention, if the value of the queried term in step 25 is above the predetermined correlation threshold in the topic-evaluation vector, the document is displayed.

In one embodiment of the present invention, after comparing the evaluation vectors to the generated query, a visual graph is displayed next to the document in question representing how relevant the document is. In another embodiment of the present invention, after comparing the evaluation vectors to the generated query, an audible alarm is sounded to notify the receiver of the document's relevance.

In one embodiment of the present invention, a stream of audio data is received, and the audio data is silenced when the value for the desired query is beneath some correlation threshold value in the topic-evaluation vector, and the audio data is played when the value for the desired query is above some correlation threshold value in the topic-evaluation vector.

Figure 3:
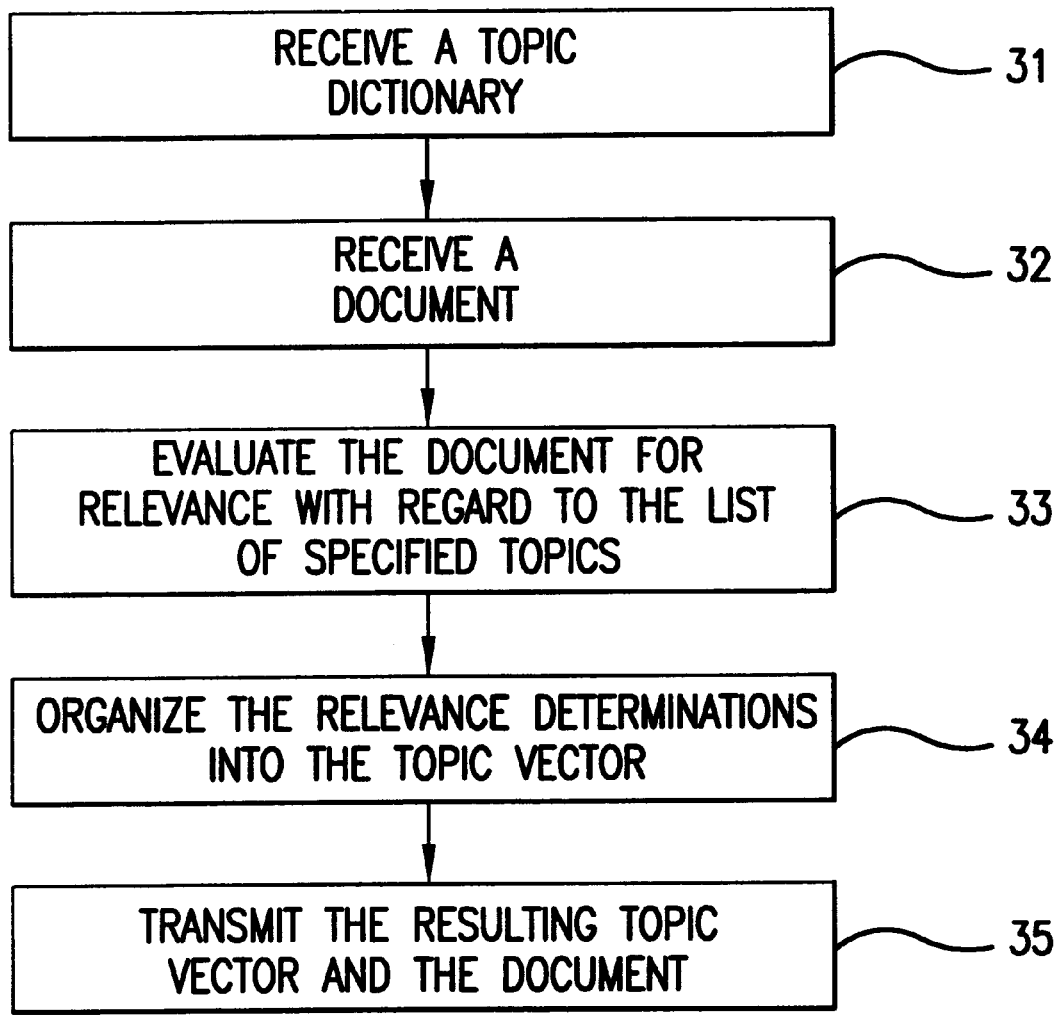
FIG. 3 is a flow chart illustrating another embodiment of a method of evaluating a document's relevance.

FIG. 3 shows a flow chart of an embodiment of a method in accordance with the present invention. In this embodiment, a sender receives a topic dictionary at step 31. The sender then receives a document at step 32, and evaluates the document for relevance with regard to the list of specified topics at step 33. This evaluation is organized at step 34 in a topic-evaluation vector that contains topical entries in a way that corresponds to the topic dictionary received at step 31, and the resulting topic-evaluation vector is transmitted. In one embodiment of the present invention, the topic-evaluation vector is transmitted with the document. In another embodiment of the present invention, the topic-evaluation vector is transmitted independently from the document with some marker identifying the topic-evaluation vector as pertaining to that document. In another embodiment of the present invention, the topic dictionary is transmitted to the receiver.

FIG. 1 shows, in receiver 300, an embodiment of a receiver apparatus in accordance with the present invention. In this embodiment, receiver memory 302 stores instructions to be run on receiver processor 301 to receive a topic dictionary, generate a query, receive a data stream that includes at least one document through receiver port 303, receive a topic-evaluation vector, and then compare the evaluation vector to the generated query and subsequently taking some action based on the degree of correlation. It should be appreciated that, for the purposes of the present invention, the word receiver, placed before the receiver processor, receiver memory, and receiver port, is simply a label to distinguish the various embodiments.

For the purposes of this document, memory includes any medium capable of storing instructions adapted to be executed by a processor. Some examples of such media include, but are not limited to, floppy disks, CDROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

In one embodiment of the present invention, receiver memory stores instructions to be run on the receiver processor to generate threshold correlation values below which no action is taken, and above which, some action is taken. For example, in one embodiment of the present invention, receiver memory stores instructions to be run on the receiver processor to decide that, if a generated query term is found in the topic-evaluation vector above some predetermined value, the document is stored in the receiver memory for later use. In another embodiment of the present invention, receiver memory stores instructions to be run on the receiver processor to decide that, if the generated query term is found in the topic-evaluation vector above some predetermined value, the document is displayed for the user. In another embodiment of the present invention, receiver memory stores instructions to be run on the receiver processor to decide that, if the generated query term is found in the topic-evaluation vector above some predetermined value, an audible alarm is set off alerting the receiver that a relevant document exists. In another embodiment of the present invention, receiver memory stores instructions to be run on the receiver processor to decide that, if the generated query term is found in the topic-evaluation vector below some predetermined value, the data is discarded.

FIG. 1 shows, in sender 100, an embodiment of a sender apparatus in accordance with the present invention. In this embodiment, sender memory 102 stores instructions to be run on sender processor 101 to receive a topic dictionary, receive a document, evaluate the document for relevance with regard to the list of specified topics, transmit the topic dictionary through sender port 103, receive a topic-evaluation vector and transmit the topic-evaluation vector and document through sender port 103. It should be appreciated that, for the purposes of the present invention, the word sender, placed before the sender processor, sender memory, and sender port, is simply a label to distinguish the various embodiments.

In one embodiment of the present invention, the sender memory stores instructions to be run on the sender processor to transmit the topic-evaluation vector along with the document through sender port 103. In another embodiment of the present invention, the sender memory stores instructions to be run on the sender processor to transmit the topic-evaluation vector separately from the document through sender port 103.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for evaluation of data relevance, comprising:
   (a) generating a query;
   (b) receiving a topic-evaluation vector the topic-evaluation vector including a plurality of relevance determinations for a collection of data, each relevance determination in the plurality of relevance determinations pertaining to a topic;
   (c) comparing the topic-evaluation vector to the generated query; and
   (d) performing a resulting action based on the results of the comparison performed in step (c).

2. The method of claim 1, further comprising:
   (e) receiving a topic dictionary, wherein the topic dictionary comprises information regarding where in the topic-evaluation vector certain topics are located.

3. The method of claim 1, further comprising:
   (e) displaying a visual graph representing how relevant the data is.

4. The method of claim 1, further comprising:
   (e) setting a correlation threshold for performing the resulting action.

5. The method of claim 4, further comprising:
   (f) requesting data that corresponds to the topic-evaluation vector if the generated query is found in the topic-evaluation vector to be above the correlation threshold.

6. The method of claim 4, further comprising:
   (f) storing data that corresponds to the topic-evaluation vector if the generated query is found in the topic evaluation vector to be above the correlation threshold.

7. The method of claim 4, further comprising:
   (f) displaying data that corresponds to the topic-evaluation vector if the generated query is found in the topic evaluation vector to be above the correlation threshold.

8. The method of claim 1, wherein the topic-evaluation vector is transmitted along with data that corresponds to the topic-evaluation vector.

9. The method of claim 1, wherein the topic-evaluation vector is transmitted independently from data that corresponds to the topic-evaluation vector.

10. The method of claim 1, wherein the collection of data is streaming data.

11. A method for evaluation of data relevance, comprising:
    (a) evaluating a document for relevance with regard to a list of specified topics;
    (b) using the relevance determination to create a topic-evaluation vector the topic-evaluation vector including a plurality of relevance determinations for a collection of data, each relevance determination in the plurality of relevance determinations pertaining to a topic; and
    (c) transmitting the topic-evaluation vector.

12. The method of claim 11, further comprising:
    (e) transmitting the evaluated document along with the topic-evaluation vector.

13. The method of claim 11, further comprising:
    (e) receiving a topic dictionary, wherein the topic dictionary comprises information regarding where in the topic-evaluation vector certain topics are located; and
    (f) transmitting the topic dictionary.

14. An apparatus for evaluation of data relevance, comprising:
    (a) a receiver processor;
    (b) a receiver port coupled to said processor; and
    (c) a receiver memory coupled to said receiver port and said receiver processor, storing receiver instructions adapted to be run on said receiver processor to
       (i) generate a query;
       (ii) receive a topic-evaluation vector, the topic-evaluation vector including a plurality of relevance determinations for a collection of data, each relevance determination in the plurality of relevance determinations pertaining to a topic;
       (iii) compare the evaluation vector to the generated query; and
       (iv) perform a resulting action based on results of the comparison.

15. The apparatus in claim 14, said receiver memory further storing receiver instructions to be run on said receiver processor to
    (v) generate threshold correlation values below which no resulting action is taken, and above which, the resulting action is taken.

16. The apparatus in claim 14, said receiver memory further storing receiver instructions to be run on said receiver processor to
    (v) request data if the generated query is found in the topic-evaluation vector to be above the threshold correlation.

17. The apparatus in claim 14, said receiver memory further storing receiver instructions to be run on said receiver processor to
    (v) store data if the generated query is found in the topic-evaluation vector to be above the threshold correlation.

18. The apparatus in claim 14, said receiver memory further storing receiver instructions to be run on said receiver processor to
    (v) display data if the generated query is found in the topic-evaluation vector to be above the threshold correlation.

19. An apparatus for evaluation of data relevance, comprising:
    (a) a sender processor;
    (a) a sender port coupled to said sender processor; and
    (c) a sender memory coupled to said sender port and said sender processor, storing sender instructions to be run on said sender processor to
       (i) evaluate a document for relevance with regard to a list of specified topics;
       (ii) use the relevance evaluation to create atopic-evaluation vector, the topic-evaluation vector including a plurality of relevance determinations for a collection of data, each relevance determination in the plurality of relevance determinations pertaining to a topic; and
       (iii) transmit the topic-evaluation vector through said sender port.

20. The apparatus of claim 19, said sender memory further storing sender instructions to be run on said processor to
 (iv) transmit the evaluated document along with the topic-evaluation vector through said port.

21. The apparatus of claim 19, said sender memory further storing sender instructions to be run on said processor to
 (iv) receive a topic dictionary; and
 (v) transmit the topic dictionary.

22. A computer-readable medium that stores instructions adapted to be executed by a processor to perform the steps of:
 (a) generating a query;
 (b) receiving a topic-evaluation vector, the topic-evaluation vector including a plurality of relevance determinations for a collection of data, each relevance determination in the plurality of relevance determinations pertaining to a topic;
 (c) calculating a correlation value by comparing the evaluation vectors to the generated query; and
 (d) performing a resulting action based on resulting correlation value.

23. The computer-readable medium in claim 22 wherein stored instructions are further adapted to be executed by a processor to perform the step of:
 (f) setting a correlation threshold for performing the resulting action.

24. The computer-readable medium in claim 22 wherein the resulting action is requesting data if the correlation value is above the correlation threshold.

25. The computer-readable medium in claim 22 wherein the resulting action is storing data if the correlation value is above the correlation threshold.

26. A method for evaluation of data relevance, comprising:
 (a) generating a query;
 (b) receiving a topic-evaluation that pertains to audio data;
 (c) comparing the topic-evaluation vector to the generated query; and
 (d) silencing the audio data when the generated query is found in the topic evaluation vector to be below a correlation threshold, and playing the audio data when the generated query is found in the topic evaluation vector to be above the correlation threshold.

27. An apparatus for evaluation of data relevance, comprising:
 (a) a receiver processor;
 (b) a receiver port coupled to said processor; and
 (c) a receiver memory coupled to said receiver port and said receiver processor, storing receiver instructions adapted to be run on said receiver processor to
  (i) generate a query;
  (ii) receive a topic-evaluation vector that pertains to audio data,
  (iii) compare the evaluation vector to the generated query; and
  (iv) play the audio data if the generated query is found in the topic-evaluation vector to be above the threshold correlation.

28. A method for allowing a user to evaluate data relevance, the method comprising:
 (a) receiving a topic-evaluation vector, the topic evaluation vector including a plurality of relevance determinations, each relevance determination in the plurality of relevance determinations pertaining to a topic in a collection of data; and
 (b) transmitting the topic-evaluation vector along with the collection of data.

* * * * *

UNITED STATES PATENT AND TRADEMARK OFFICE
CERTIFICATE OF CORRECTION

PATENT NO. : 6,131,091
DATED : October 10, 2000
INVENTOR(S) : John J. Light

It is certified that error appears in the above-identified patent and that said Letters Patent is hereby corrected as shown below:

Title page,
Item [54], should read "SYSTEM AND METHOD FOR HIGH-PERFORMANCE DATA EVALUATION" should be -- SYSTEM AND METHOD FOR HIGH-PERFORMANCE DATA EVALUATION USING TOPIC EVALUATION VECTOR --

Column 2,
Line 61, "than, say 100" should be -- than 100 --

Column 5,
Line 15, "vector the" should be -- vector, the --

Signed and Sealed this

Second Day of October, 2001

Attest:

NICHOLAS P. GODICI
Attesting Officer    Acting Director of the United States Patent and Trademark Office